(12) United States Patent
Jonsdottir

(10) Patent No.: US 8,547,348 B2
(45) Date of Patent: Oct. 1, 2013

(54) METHOD AND APPARATUS FOR PROVIDING FINGER TOUCH LAYERS IN A USER AGENT

(75) Inventor: Gerdur Jonsdottir, Oslo (NO)

(73) Assignee: Opera Software ASA, Oslo (NO)

(*) Notice: Subject to any disclaimer, the term of this patent is extended or adjusted under 35 U.S.C. 154(b) by 483 days.

(21) Appl. No.: 12/556,268

(22) Filed: Sep. 9, 2009

(65) Prior Publication Data

US 2010/0066694 A1    Mar. 18, 2010

Related U.S. Application Data

(60) Provisional application No. 61/095,792, filed on Sep. 10, 2008.

(51) Int. Cl.
    *G06F 3/041* (2006.01)

(52) U.S. Cl.
    USPC .......................... 345/173; 345/174; 715/863

(58) Field of Classification Search
    None
    See application file for complete search history.

(56) References Cited

U.S. PATENT DOCUMENTS

| | | |
|---|---|---|
| 7,194,699 B2 | 3/2007 | Thomson |
| 2004/0135818 A1 | 7/2004 | Thomson et al. |
| 2006/0022955 A1 | 2/2006 | Kennedy |
| 2008/0122796 A1* | 5/2008 | Jobs et al. ............ 345/173 |

FOREIGN PATENT DOCUMENTS

| | | |
|---|---|---|
| CN | 1717648 A | 1/2006 |
| CN | 101031867 A | 9/2007 |
| WO | WO 2004/05392 A2 | 6/2004 |
| WO | WO 2005/106637 A2 | 11/2005 |
| WO | WO 2008/029180 A1 | 3/2008 |

* cited by examiner

*Primary Examiner* — Adam R Giesy
*Assistant Examiner* — Ifedayo Iluyomade
(74) *Attorney, Agent, or Firm* — Birch, Stewart, Kolasch & Birch, LLP

(57) ABSTRACT

A method and apparatus for selecting an item on a display screen with a touch interface by touching the display screen with a finger or stylus-type device. The touch point on the screen is detected, and a touch radius is established with respect to the touch point. When selectable items are detected to be displayed at least partially within the touch radius of the touch point, they are partially activated by altering the manner in which they are displayed. Upon detection of another touch point selecting a partially activated item, that item is fully activated and the other partially activated items are deactivated.

22 Claims, 10 Drawing Sheets

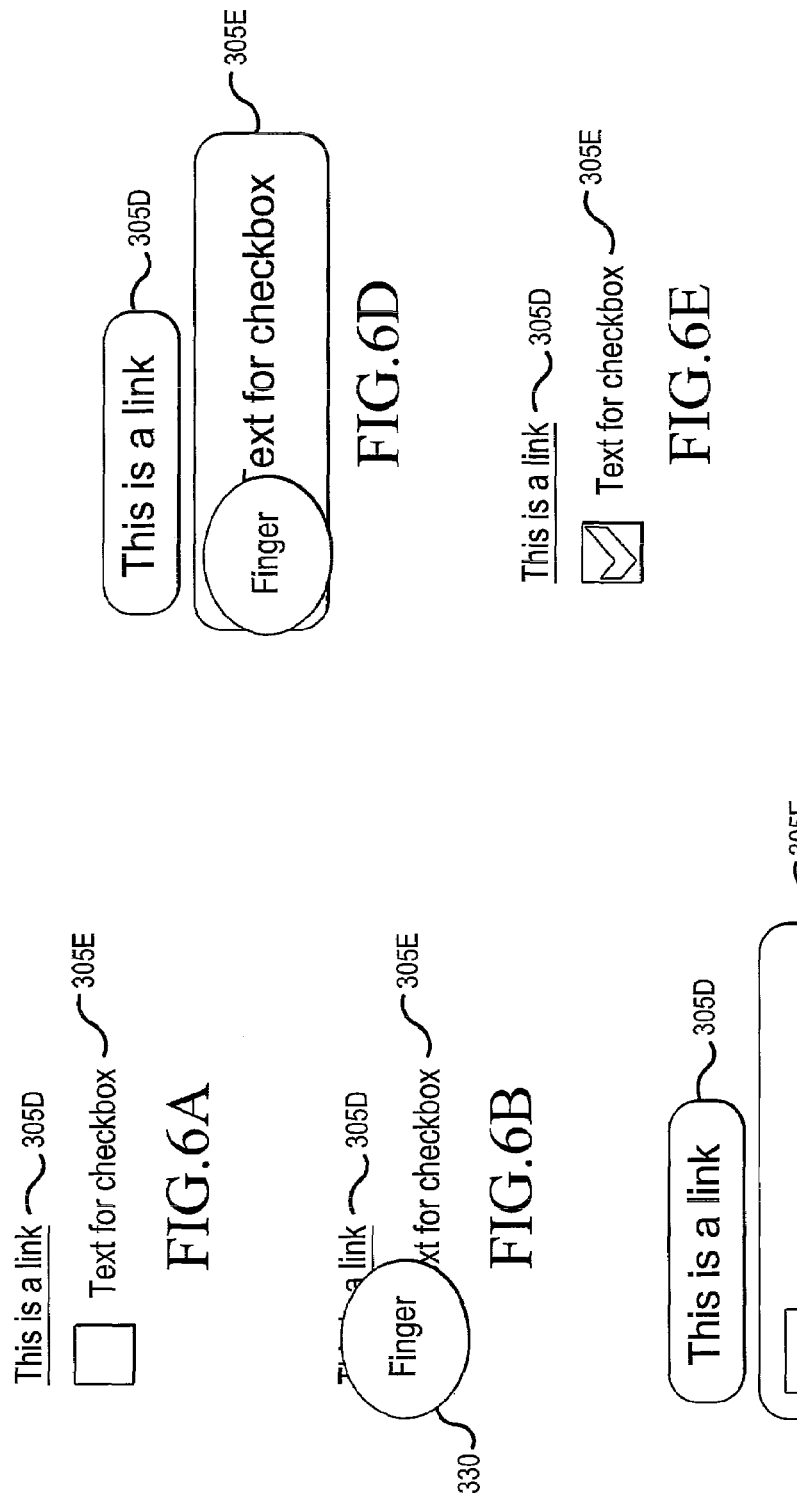

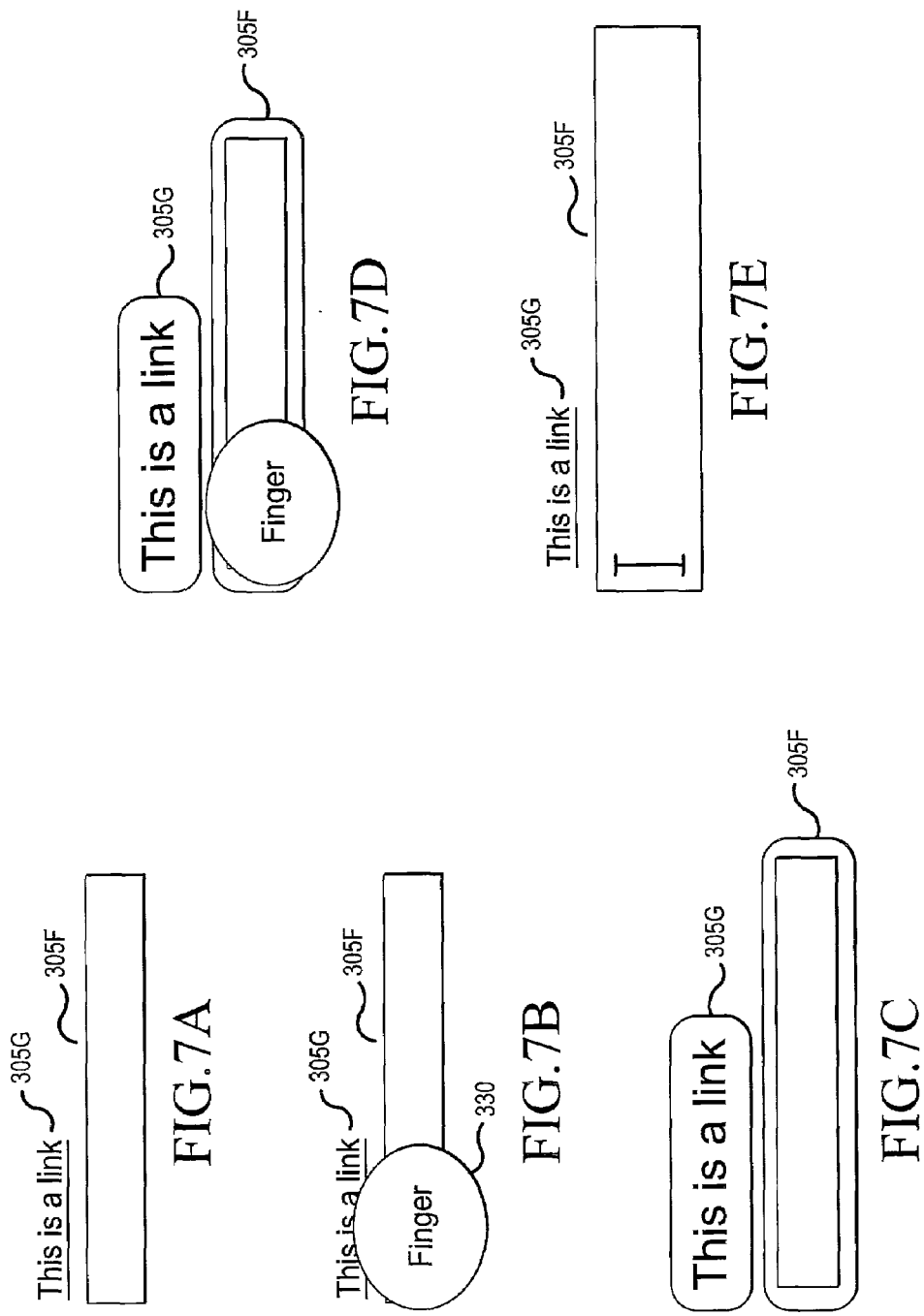

METHOD AND APPARATUS FOR PROVIDING FINGER TOUCH LAYERS IN A USER AGENT

CROSS-REFERENCE

This non-provisional application claims priority under 35 U.S.C. §119(e) on U.S. Provisional Application No. 61/095,792, filed Sep. 10, 2008, the entire contents of which are incorporated herein by reference into the present application.

FIELD OF THE INVENTION

The invention relates generally to activating links using a user agent such as a web browser which is implemented in a handheld or mobile device.

BACKGROUND OF THE INVENTION

Computer users typically use user agent applications such as web browsers to access documents and other resources that are available over a computer network to which their computer is connected. Such resources may be identified by a Uniform Resource Identifier (URI), usually a Uniform Resource Locator (URL), which identifies the resource uniquely and provides the information necessary for locating and accessing the resource. A web page or other document, which is displayed on a user agent such as a web browser, may provide a link to the URI of a particular resource. Thus, user agents generally provide an interface allowing a user to activate a link in order to access the corresponding resource. For example, conventional interfaces for user agents such as web browsers include clicking devices, such as a mouse, to allow a user to click on a link to activate it.

The interface of a user agent may serve other functions in addition to activating links. For instance, there may be other types of elements on a web page than just links with which the user may interact. For instance, a user may input information by clicking on a radio button, or by clicking on and typing information in an edit field. Also, the user may be allowed to click on images in the web page in order to display larger versions thereof.

However, the interfaces provided on user agents in mobile or handheld devices may prove to be troublesome to the user. For instance, trying to click small links in web pages on mobile devices at a normal reading zoom level has historically been very error-prone. The latest trend for mobile and handheld devices has been to implement a touch-screen input device to allow the user to use finger touch or a stylus to perform the "click" action. Conventional touch-screen devices normally detect the location of contact of the finger/stylus as a single point on the screen (similar to a mouse click), even though the user made contact with a larger surface area of the screen. This becomes problematic since, due to the size constraints of the mobile or handheld device, it can be difficult for the user to accurately aim the finger or stylus at a specific point on a screen. As a result, the user's attempt to click on a particular interactive element could result in no element or the wrong element being clicked.

Thus, it would be advantageous to provide a less error-prone way of allowing a user to interact with a user agent such as a web browser using his/her finger or a stylus.

SUMMARY OF THE INVENTION

A system and method is provided to allow a user agent with a touch screen interface to provide the user a certain margin of error when using his/her finger or stylus to click on an interactive element on the display.

For example, when a user's finger is used to perform the click action, it can be assumed that the finger will cover a certain area and merely detecting a single point for the click might not be accurate. Exemplary embodiments of the present invention utilize this concept by determining a coverage area, i.e., "touch radius," around the point on the touch-sensitive display where the click was detected. The area within the touch radius may be scanned for any interactive elements (e.g., links, images, or form controls) that are contained, or at least partially contained, therein. Any interactive elements detected as a result of such scanning may be treated as potential targets of the user.

According to an exemplary embodiment, when multiple interactive elements are detected as potential targets as a result of the scanning, resulting in an ambiguity as to which interactive element the user intended to touch, such elements may be expanded on the display. The expanding of such elements may help resolve the ambiguity by making it easier for the user to touch the intended target. Yet further embodiments of the present invention may highlight or animate interactive elements to indicate that they are in the radius of potentially selected items if, for example, such elements are already equal to or larger than a predetermined size. Further embodiments still may combine expansion with animation, highlighting, or other display effects to indicate they are in the radius of potentially selected elements. Yet further embodiments may associate different types of interactive elements with different scales or degrees of expansion and/or different types of display effects; thus, when disparate types of interactive elements are within the radius, each element type may be provided with a distinct display effect and/or scale of expansion with respect to the other element types.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein

FIGS. 6A-6E illustrate the expansion of a link and a simple form control, which are within the touch radius, according to an exemplary embodiment; and FIGS. 7A-7E illustrate the expansion of a link and a complex form control, which are within the touch radius, according to an exemplary embodiment The drawings will be described in detail in the course of the detailed description of the invention.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

The present invention is directed toward a computer-implemented method and device to facilitate a user's interaction with a user agent (e.g., web browser) via a touch-screen interface. This method may be implemented as part of the user agent in order to reduce errors in the user agent's determination of which interactive element on the display the user intended to activate by touch.

For purposes of this specification, the term "interactive element" refers to any element of a web page or other type of displayable document with which a user may interact to access or input data. Interactive elements may include, but are not limited to, the following types: hyperlinks or links, images which act as links, simple form controls (e.g., buttons, checkboxes, radio buttons), or complex form controls (e.g., edit fields, drop-down list, listboxes). More detail regarding these types of interactive elements will be provided below.

Further, for purposes of this specification, the term "activate" refers to the act of invoking underlying functionality of an interactive element, or changing the state of the interactive element to make it functional. For example, "activate" may refer to opening a link to access a further resource, clicking on a simple form control (e.g., checkbox or radio button), or making it possible to edit/interact with a complex form control (e.g., putting an edit field in an editable state).

Figure 1:
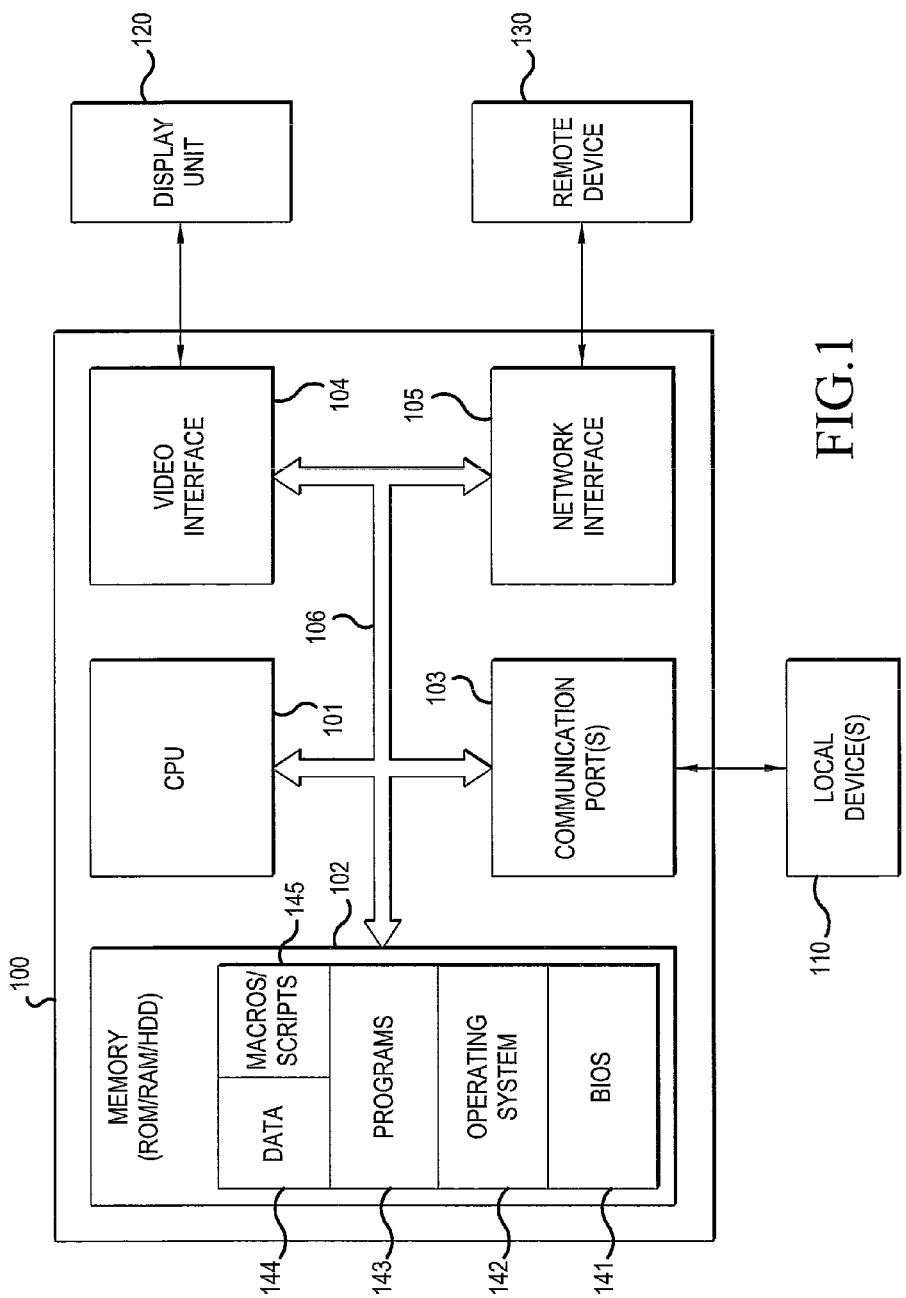
FIG. 1 is a diagram illustrating a computing device that can be used for implementing exemplary embodiments of the present invention.

FIG. 1 illustrates a generalized computing device 100 that can be used as an environment for implementing various aspects of the present invention. According to exemplary embodiments, it is contemplated that the computer device 100 may be implemented as a mobile or handheld device, e.g., a personal digital assistant (PDA), mobile telephone, etc. However, the principles of the present invention may be applied to other types of computer devices 100, such as desktop computer, laptop computers, and any other type of computer device 100 as will be contemplated by those of ordinary skill in the art.

In FIG. 1, a device 100 has various functional components including a central processor unit (CPU) 101, memory 102, communication port(s) 103, a video interface 104, and a network interface 105. These components may be in communication with each other by way of a system bus 106.

The memory 102, which may include ROM, RAM, flash memory, hard drives, or any other combination of fixed and removable memory, stores the various software components of the system. The software components in the memory 102 may include a basic input/output system (BIOS) 141, an operating system 142, various computer programs 143 including applications and device drivers, various types of data 144, and other executable files or instructions such as macros and scripts 145.

The communication ports 103 may be connected to one or more local devices 110 such as user input devices, a printer, a media player, external memory devices, and special purpose devices such as e.g. a global positioning system receiver (GPS). Communication ports 103, which may also be referred to as input/output ports (I/O), may be any combination of such ports as USB, PS/2, RS-232, infra red (IR), Bluetooth, printer ports, or any other standardized or dedicated communication interface for local devices 110.

The video interface device 104 is connected to a display unit 120. According to exemplary embodiments, the display unit 120 has a touch-sensitive screen allowing the display unit 120 to double as a touch-sensitive input device. The touch-sensitive input device aspects of the display unit 120 may be considered as one of the local devices 110 communicating over a communication port 103. Further, for exemplary embodiments in which the computing device 100 is implemented as a PDA, mobile telephone, or other small portable devices, the display will generally be an integrated display such as an LCD display. However, it will be readily apparent that the principles of the present invention may be applied to situations where the display unit 120 is not integrated with the other elements of the computing device 100, e.g., where the display unit 120 is a standalone monitor.

The network interface device 105 provides the device 100 with the ability to connect to a network in order to communicate with a remote device 130. The communication network, which in FIG. 1 is only illustrated as the line connecting the network interface 105 with the remote device 130, may be, e.g., a local area network or the Internet. The remote device 130 may in principle be any computing device with similar communications capabilities as the device 100, but may typically be a server or some other unit providing a networked service.

It will be understood that the device 100 illustrated in FIG. 1 is not limited to any particular configuration or embodiment regarding its size, resources, or physical implementation of components. For example, more than one of the functional components illustrated in FIG. 1 may be combined into a single integrated unit of the device 100. Also, a single functional component of FIG. 1 may be distributed over several physical units. Other units or capabilities may of course also be present. Furthermore, the device 100 may, e.g., be a general purpose computer such as a PC, or a personal digital assistant (PDA), or even a cellphone or a smartphone.

Figure 2:
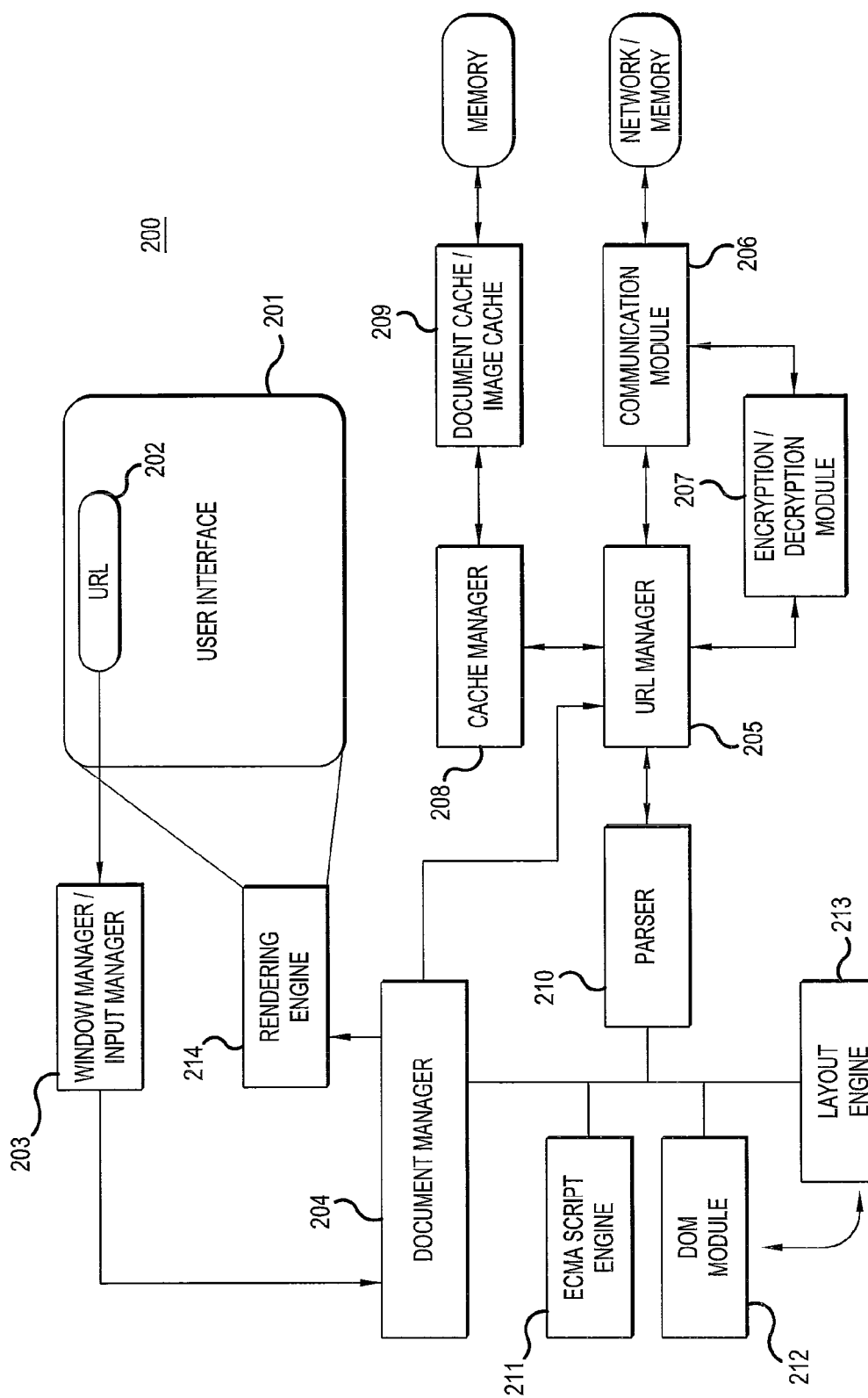
FIG. 2 is diagram illustrating a user agent that may be used in conjunction with exemplary embodiments of the present invention.

In an exemplary embodiment, various aspects of the present invention may be incorporated into, or used in connection with, the components and/or functionality making up a user agent or browser installed as an application on a device 100. FIG. 2 shows an example of a number of modules that may be present in such a user agent or browser. The modules will typically be software modules, or otherwise implemented by a programmer in software, and may be executed by the CPU 101. However, it is also possible for any of the modules of FIG. 2 to be implemented as hardware, a combination of hardware and software, or "firmware," as will be contemplated by those skilled in the art.

The user agent or browser 200 presents the user with a user interface 201 that may be displayed on the display unit 120 shown in FIG. 1. The user interface 201 may include an address field 202 where the user may input or select the URL of a document or a service he or she wants the user agent 200 to retrieve. For example, the user may use a keyboard or other type of input device to type in the URL in the address field 202. The address field 202 may also be a link that is displayed and may be activated by the user by touch according to principles of the present invention (alternatively, such a link may also be activated using a pointing device such as a mouse). Alternatively the URL may be specified in the code of a document or script already loaded by the user agent 200.

In any case, the URL may be received by a window and input manager 203 that represents the input part of the user interface 201 associated with, or part of, the user agent 200. The URL may then be forwarded to a document manager 204, which manages the data received as part of the document identified by the URL.

The document manager 204 forwards the URL to a URL manager 205, which instructs a communication module 206 to request access to the identified resource. The communication module 206 may be capable of accessing and retrieving data from a remote device 130 such as a server over a network using the hypertext transfer protocol (HTTP), or some other protocol such as HTTPS or FTP. The communication module 206 may also be capable of accessing data that is stored in local memory 102.

If communication outside the device 100 is required to be encrypted, e.g., as specified by the protocol used to access the URL, encryption/decryption module 207 handles communication between the URL manager 205 and the communication module 206.

The data received by the communication module 206 in response to a request is forwarded to the URL manager 205. The URL manager 205 may then store a copy of the received content in local memory 102 using a cache manager 208 which administers a document and image cache 209. If the same URL is requested at a later time, the URL manager 205 may request it from the cache manager 208, which will retrieve the cached copy from the cache 209 (unless the cached copy has been deleted) and forward the cached copy to the URL manager 205. Accordingly, it may not be necessary to retrieve the same data again from a remote device 130 when the same URL is requested a second time.

The URL manager 205 forwards the data received from the communication port 206 or cache 209 to a parser 210 capable of parsing content such as HTML, XML and CSS. The parsed content may then, depending on the type and nature of the content, be processed further by an ECMAScript engine 211, a module for handling a document object model (DOM) structure 212, and/or a layout engine 213.

This processing of the retrieved content is administered by the document manager 204, which may also forward additional URL requests to the URL manager 205 as a result of the processing of the received content. These additional URL's may, e.g., specify images or other additional files that should be embedded in the document specified by the original URL.

When the data representing the content of the specified document has been processed it is forwarded from the document manager 204 in order to be rendered by a rendering engine 214 and displayed on the user interface 201.

The various modules thus described are executed by the CPU 101 of device 100 as the CPU 101 receives instructions and data over the system bus(es) 106. The communications module 206 communicates with the remote device 130 using the network interface 105. The functionality of various modules in FIG. 2 may of course be integrated into fewer larger modules. Also, the functionality of a single module in FIG. 2 may be distributed or replicated over several modules.

It will further be understood that, while the user agent 200 described above may be implemented as an application program 143, some of the user agent's 200 functionality may also be implemented as part of the operating system 142 or even the BIOS 141 of the device 100. The content received in response to a URL request may be data 144, script 145, or a combination thereof as further described below.

Figure 3A:
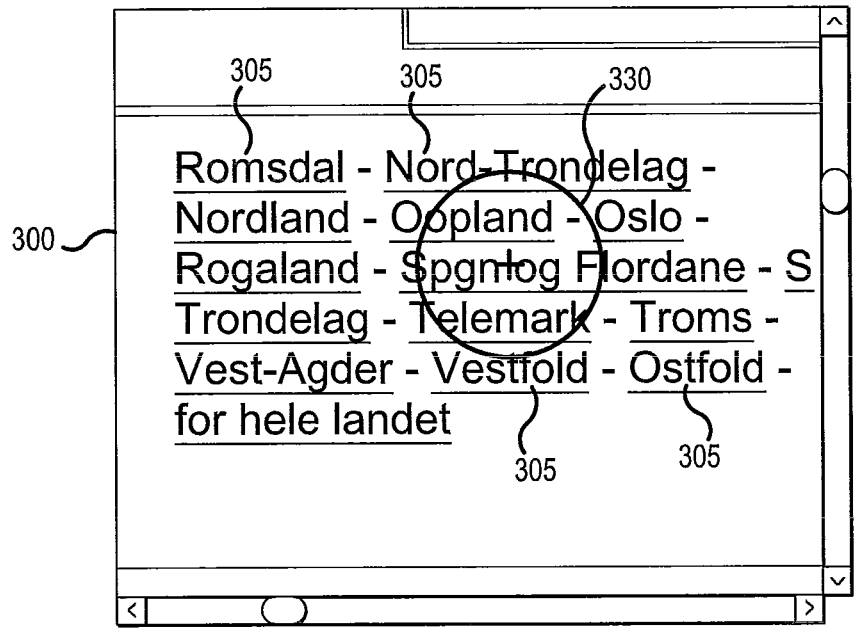
FIGS. 3A and 3B each illustrates a detected click and the area corresponding to a "touch radius" on the screen of a mobile or handheld device according to an exemplary embodiment of the present invention.
Figure 3B:
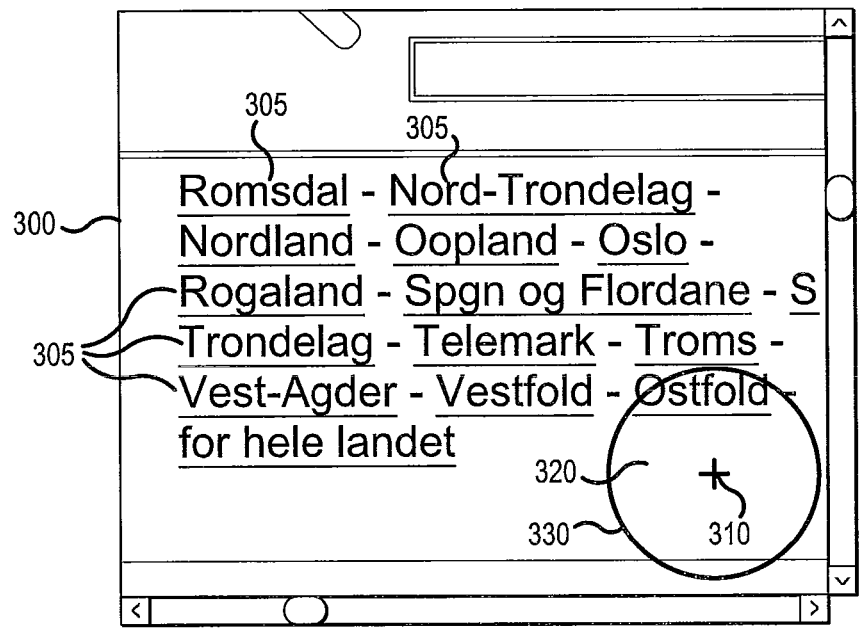

Reference is now made to FIGS. 3A and 3B, each showing an exemplary screen shot 300 from a user agent 200 to illustrate principles of the present invention. Particularly, as shown in each screen shot 300, the user interface 200 is displaying interactive elements 305 which are links to URI's in this particular example. Further, these screen shots illustrate a point 310 (indicated by "+") corresponding to the location of a click detected by the touch-screen input device integrated into the display unit 120 as a result of a user touch (the integrated touch-screen input device and display unit 120 will sometimes be referred to hereafter as "the touch-sensitive display screen," or simply "the display screen"). As discussed earlier, conventional touch-screen input devices normally detect the touch of a finger or stylus as a single point.

However, as further shown in these figures, exemplary embodiments of the invention determine an area 320 surrounding the location 310 of the detected click defined by a radius 330. For example, in FIG. 3A, six of the interactive elements 305 (links) are at least partially within the touch radius 330 (i.e., area 320 at least partially encompasses six of the links 305). In FIG. 3B, on the other hand, only one of the interactive elements 305 (links) partially falls within the touch radius 330.

Figure 4A:
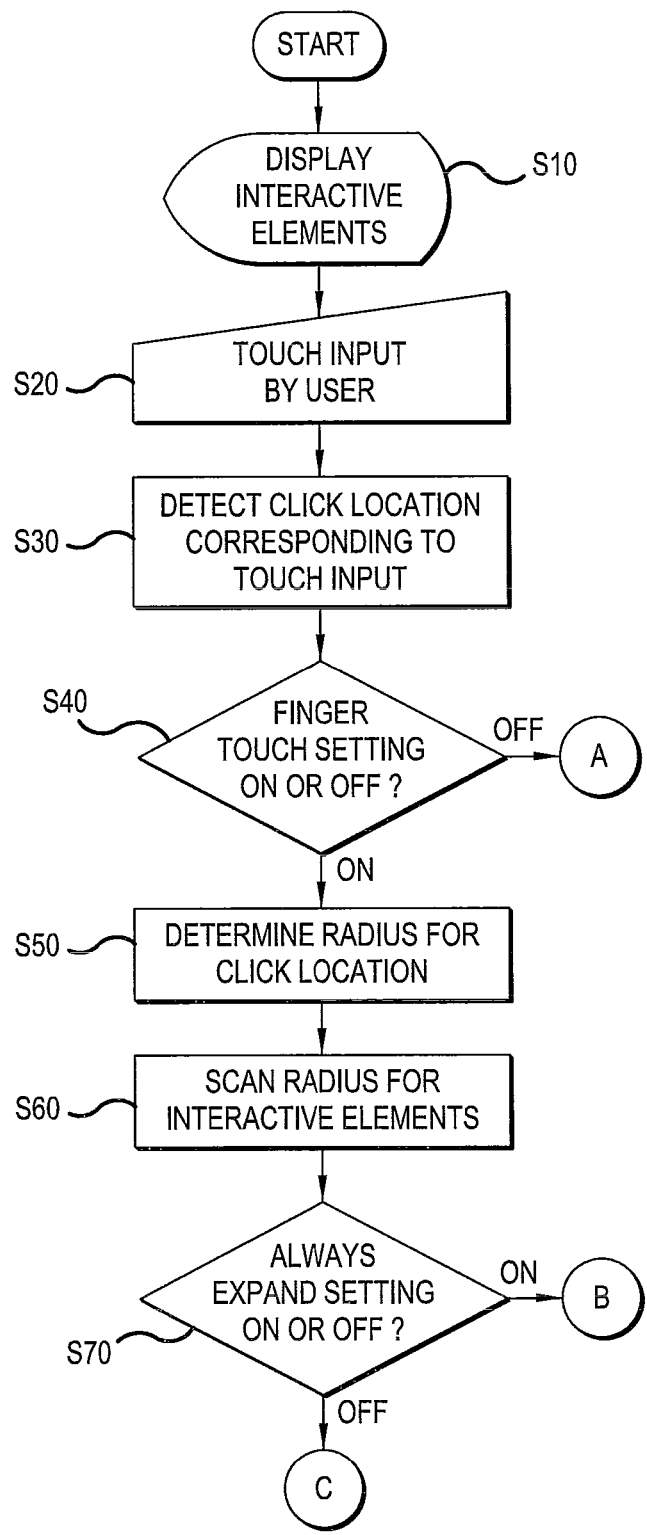
FIGS. 4A-4E provide a flow chart illustrating a method according to exemplary embodiments of the present invention.

According to an exemplary embodiment, a default size for the touch radius 330 may be determined individually for each device 100 in an exemplary embodiment based on factors such as resolution, dots per inch (dpi), quality of the screen, default zoom level, etc. As will be discussed in more detail in connection with FIG. 4A below, the default size may further be modified to a specific user, e.g., via a calibration technique.

Although the interactive elements 305 are shown as being links in the exemplary embodiments of FIGS. 3A and 3B, the principles of the present invention may be applied to other types of interactive elements including, but not limited to, images that are links, simple form controls, and complex form controls. A description of these additional types of interactive elements 305 are provided below:

Simple form controls: Form controls whose functionality is invoked by a single click by the user. Examples are buttons, checkboxes, and radio buttons.

Complex form controls: Form controls that require more complex behavior by the user than a single click. Examples are edit fields, drop-down lists, and listboxes. A complex form control is activated when it is in a state allowing the user to edit it or interact with it to invoke the underlying functionality. For example, when an edit field is activated, a cursor may be provided in the edit field allowing the user to enter text within it. As another example, when a drop-down list is activated, a list of sub-elements drops down below in order to allow the user to click on one of the sub-elements.

Description of Exemplary Method of Expanding Interactive Elements:

FIGS. 4A-4E provide a flow chart illustrating a method for expanding interactive elements according to exemplary embodiments of the present invention.

In describing the method of FIGS. 4A-4E, mention will be made of "expanding" an interactive element 305. The term "expand" will generally mean to enlarge the size of the element 305 on the display to a predetermined size large enough to make it easy to hit by a finger (or stylus). However, according to an exemplary embodiment of the invention, if an element 305 to be expanded is already at a size equal to or larger than the predetermined size, the "expansion" of such element 305 may not result in any further enlargement, but instead may result in another type of animation or display effect (e.g., highlighting) showing that the element 305 is determined to be a potential target of selection by the user. Further description of such animations or display effects will be provided below. Any such size-expansion, animation, or display effect of an interactive element 305 can be considered a "partial activation" of such element 305, although it does not result in fully activating or invoking the intended functionality of such element 305.

The method starts with the user agent 200 displaying a web page or other type of document including one or more interactive elements 305 as illustrated in step S10. Thereafter, the user may to select one of the displayed interactive elements 305 for interaction by touching (e.g., with a finger or stylus) the element 305 on the touch-sensitive display screen 120 as shown in step S20. As described above, the touch-sensitive display screen 120 may detect this touch as a click action at a single point 310 on the screen 120. Thus, the location of this click point is determined in step S30.

According to an exemplary embodiment, the user agent 200 may allow the user to specify whether the expansion of interactive elements 305 within a touch radius 330 is enabled or not. For instance, the user may be able to navigate to a section of the user interface 201, e.g., using a menu, which allows the user to turn on or off a setting which enables interactive elements 305 according to touch. Within this specification, such a setting is referred to as the Finger Touch setting. As illustrated in step S40 of FIG. 4A, a determination may be made as to whether the Finger Touch setting is turned on or off.

Figure 4B:
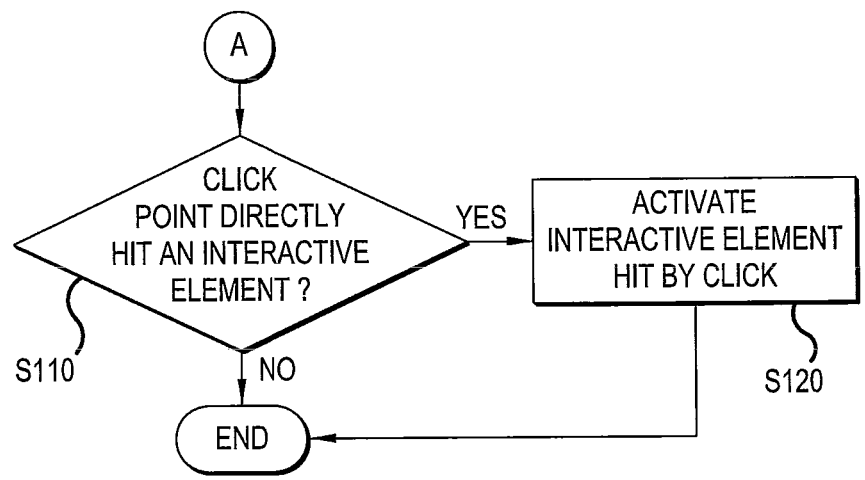

If Finger Touch is turned off, and thus expansion of interactive elements 305 according to principles of the present invention is not enabled, a conventional processing of the user touch is performed as shown in FIG. 4B. I.e., a determination is made as to whether one of the displayed interactive elements 305 was directly hit by the click location (step S110), and if so, such interactive element 305 is activated (step S120).

However, referring again to FIG. 4A, if Finger Touch is turned on in step S40, processing may proceed to step S50 where the radius 330 surrounding the detected touch location on the touch-sensitive display screen 120 is determined. As discussed above, the default size of the touch radius 330 may be specific to the particular device 100 in which the user agent 200 is implemented, e.g., taking into account the resolution, dpi, default zoom level, and/or other parameters.

However, the size of the radius 330 may also be modified to conform to the specific usage of an individual user. For instance, an application comprising a configuration wizard may be provided on the device 100 for a first-time-user to determine an optimal size for the radius 330 taking into account the user's aim. Such a wizard may ask the user to hit a few points with his/her finger (or stylus), and use the results may be used to determine an optimal size. Another example of modifying the size of radius 330 would be to manage it as an application or device setting adjustable by the user (e.g., using a slider), thereby allowing the user to increase or decrease how aggressive the radius 330 is in expanding interactive elements 305.

According to an exemplary embodiment, whether set by default or modified to conform to a user, it is contemplated that an optimally determined size for the touch radius 330 will on average detect no more than two interactive elements 305 on the display screen 120.

Referring again to FIG. 4A, after determining the radius 330 surrounding the point 310 of the detected touch on the touch-sensitive display screen 120 (step S50), the area 320 within the touch radius 330 is scanned in step S60 to find any interactive elements 305 (e.g., links, images, or form controls) which are at least partially within the area 320. However, according to one exemplary embodiment, the interactive elements 305 found as a result of this scanning may exclude any elements 305 which are outside the screen boundaries such that they are not visible to the user, since there is little likelihood that the user is attempting to select an interactive element 305 not currently displayed.

An exemplary embodiment of the present invention contemplates that different scenarios of interactive element expansion may be implemented dependent on a user's preference. For instance, the user may be allowed to turn on/off an Always Expand Nearby Elements setting (referred to in shorthand in FIG. 4A as the "Always Expand Setting"). According to this embodiment, when Always Expand Nearby Elements is turned on, all the displayed interactive elements 305 found within the scanned area 320 of radius 330 are expanded (except for those elements 305 excluded as being outside the display boundaries). However, Always Expand Nearby Elements may be turned off in order to limit the expansion of interactive elements 305 to situations where an ambiguity arises.

Figure 4E:
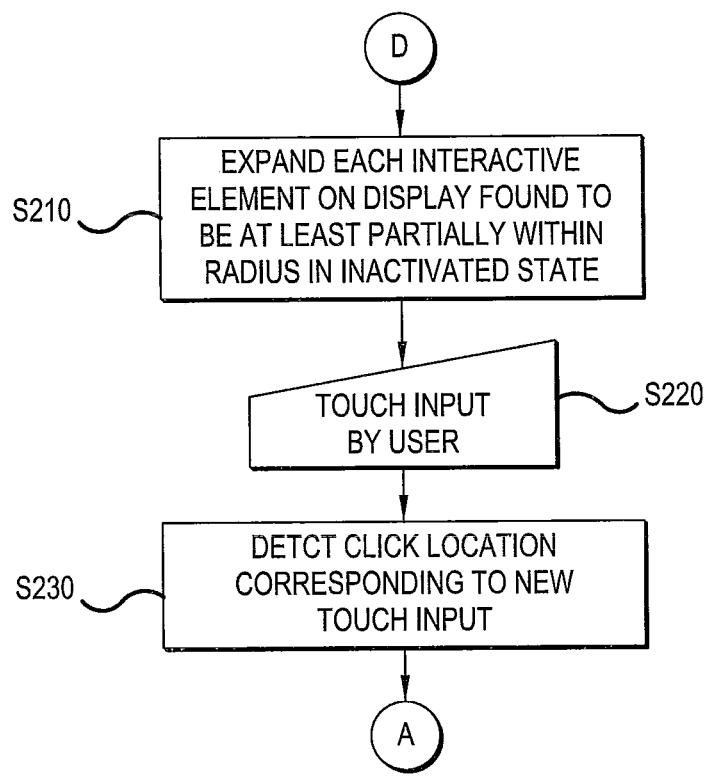
Figure 4C:
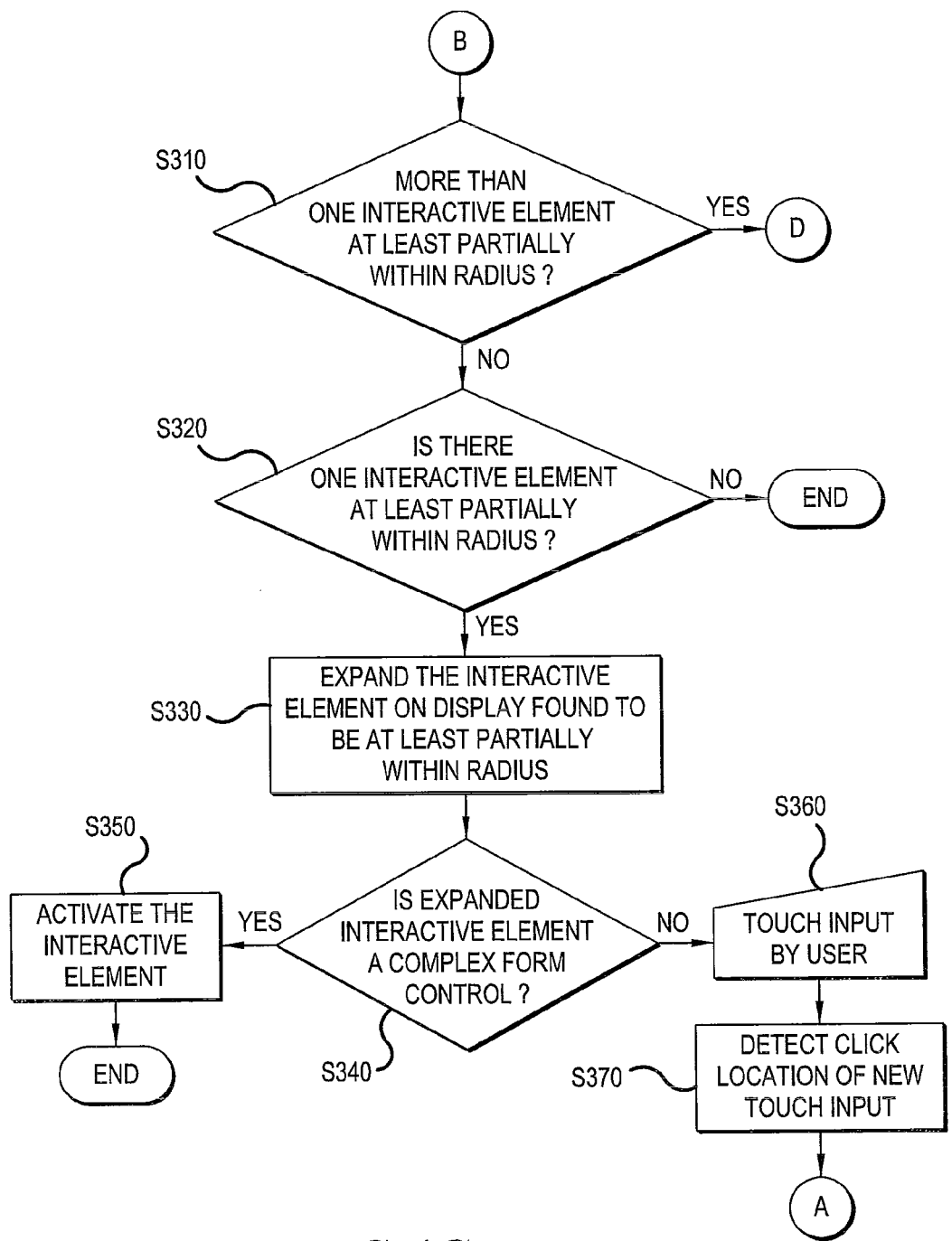

Specifically, if step S70 determines that Always Expand Nearby Elements is on, the method proceeds according to FIG. 4C.

As shown in step S310 of FIG. 4C, a determination is made as to whether multiple interactive elements 305 are found to be a least partially within the scanned area 320 of the touch radius 330. If so, all such interactive elements 305 are expanded (step S210 of FIG. 4E), the user can re-attempt to touch the desired (expanded) interactive element 305 (steps S220 and S230 of FIG. 4E), and the desired element 305 is activated if the touch successfully hits it (steps S110 and S120 of FIG. 4A).

However, if step S310 of FIG. 4C determines that multiple interactive elements 305 were not found at least partially within the touch radius 330, then a determination is made in step S320 whether even a single interactive element 305 was found at least partially within the radius 330. If not, it is assumed that the user did not intend to activate any of the interactive elements 305 with his/her touch (or there is not enough information to determine the user's intent), and the method is terminated. However, if there was a single interactive element 305 found to be at least partially within the touch radius 330, it is expanded according to step S330. In a further exemplary embodiment, if this singular interactive element 305 is determined to be a complex form control, it may also be activated in addition to being expanded as shown in steps S340 and S350. Other types of interactive elements 305 (links, images with links, simple form controls) may simply be expanded as shown in steps S340 and S360, allowing the user another attempt to select it by touch in accordance with step S370 in combination with steps S110 and S120 of FIG. 4B.

Concrete examples of how different types of interactive elements 305 are expanded (and further activated, if appropriate) will be provided below in connection with FIGS. 5-7.

Figure 4D:
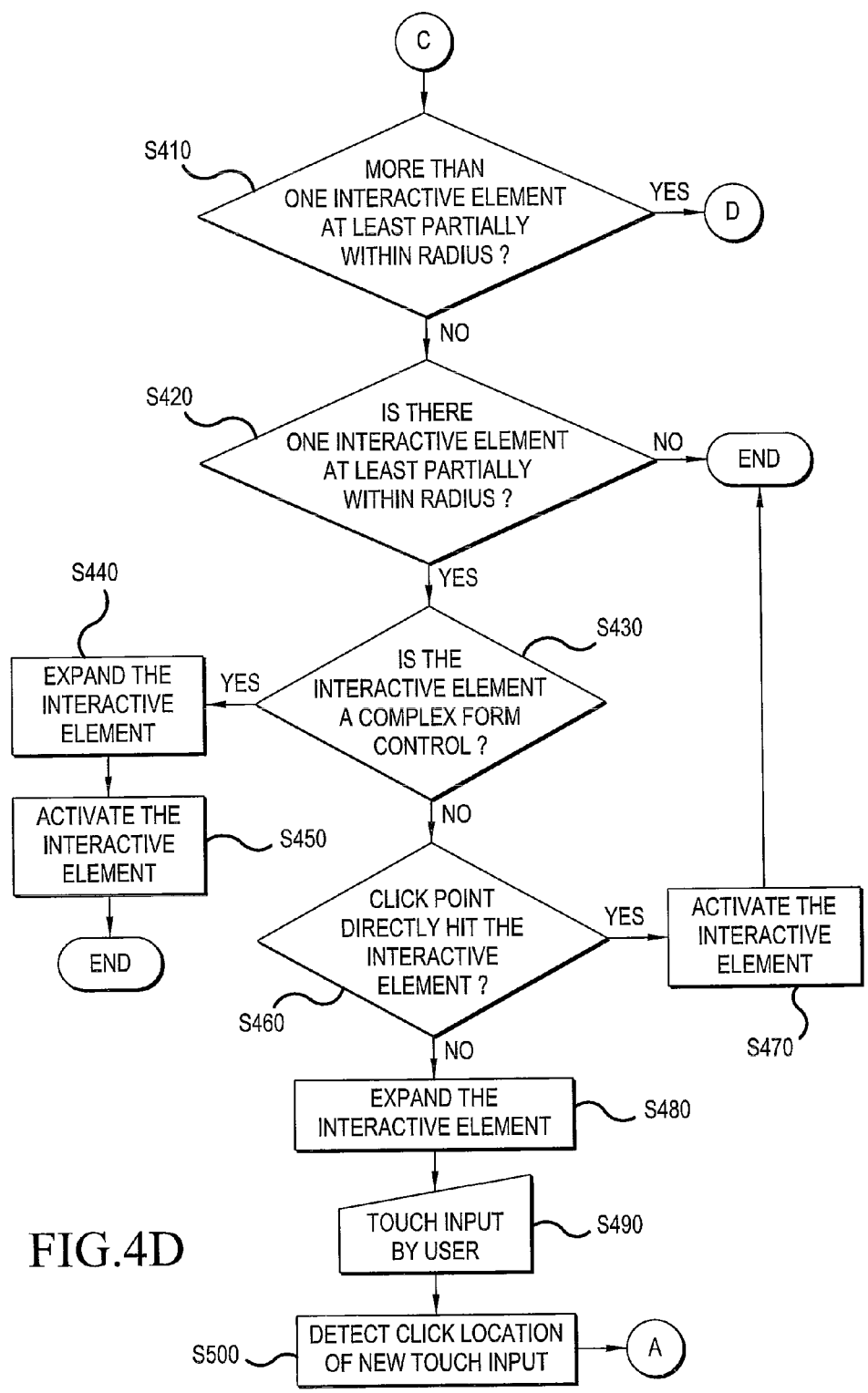

However, a different scenario of element expansion may be put into effect if Always Expand Nearby Elements is off Referring again to FIG. 4A, if step S70 determines that Always Expand Nearby Elements is turned off, the method proceeds according to FIG. 4D.

In effect, FIG. 4D illustrates a scenario which allows for an interactive element 305 to be activated, regardless of element type, without first requiring expansion and further user interaction (i.e., re-touch). Specifically, such activation may occur according to the scenario of FIG. 4D when it is determined that there is no ambiguity as to the user's intent to select that element 305, as will be described below.

Similar to the case where Always Expand Nearby Elements is turned on, if there are more than one interactive element 305 at least partially within the touch radius 330 when Always Expand Nearby Elements is turned off, all such elements 305 are expanded without being activated, as shown in step S410 of FIG. 4D in combination with step S210 of FIG. 4E. Namely, there is an ambiguity as to which of the multiple elements 305 the user intended to activate and, accordingly, the user is provided with expanded potential targets from which he/she may select by touch (see steps S220 and S230 of FIG. 4E).

Referring again to FIG. 4D, if multiple interactive elements 305 are not found to be at least partially within the area 320 of touch radius 330, step S420 determines whether a single interactive element 305 was found to be at least partially within the radius 330. If not, it is assumed that the user did not intend for his/her touch to activate any of the interactive elements 305 (or there is not enough information to determine the user's intent), and the method is terminated. However, if a single interactive element 305 was found to be at least partially within the touch radius 330, then the method proceeds to step S430.

According to an exemplary embodiment, it may be advantageous to expand an interactive element 305, such as complex form controls, even if it can be determined that the user intended to select such element 305 without ambiguity. This is because it is easier for a user to edit or otherwise interact with a complex form control if it is in an expanded state. Thus, according to steps S430 and S440 of FIG. 4D, when a complex form control is found to be the only interactive element 305 at least partially within the touch radius 330, it is expanded regardless of whether or not it was directly hit by user's touch. According to a further exemplary embodiment, as shown in step S450, the complex form control may also be activated after expansion if it is determined to be the only interactive element 305 at least partially within the touch radius 330.

Next, if step S460 of FIG. 4D determines that the interactive element 305 at least partially within touch radius 330 was directly hit at the click point 310, it can be determined that no ambiguity exists because the user presumably intended to activate the interactive element 305 which he/she actually touched. As such, the interactive element 305 may be activated according to step S470. It is also contemplated that there might be advantages to activating the element 305 in an expanded state. Thus, step S470 could be implemented to expand a previously non-expanded element 305 immediately before activating the element 305. For example, if a link is to be activated in step S460, the link may first be expanded and then immediately activated without user intervention therebetween. Further, step S470 may additionally perform an optional animation showing the user that the element 305 has been activated (as will be described in further detail below).

However, if step S460 of FIG. 4D determines that the interactive element 305 within touch radius 330 was not directly hit by the click point 310, the method proceeds to step S480. In this situation, it is determined that an ambiguity as to the user's intent exists and the element 305 should be expanded. Thus, the method proceeds to expand the element 305 (step S480), and allow the user to touch the expanded element 305 in order to activate it (steps S490 and S500 in FIG. 4D, in combination with steps S110 and S120 of FIG. 4B).

Comments will now be provided as to how the above-described method of FIGS. 4A-4E would specific situation illustrated in FIGS. 3A and 3B. The situation shown in FIG. 3A is one where six links ("Nord-Trøndelag," "Oppland," "Oslo," "Sogn og Fjordane," "Telemark," and "Vestfold") are at least partially within the scanned area 320 of touch radius 330. In accordance with the above-described method of FIGS. 4A-4D, all six of these links would be expanded regardless of whether Always Expand Nearby Elements is on or off. The situation of FIG. 3B is one where only one link ("Østfold") is found partially within the area 320 of radius 330. In this situation, since this link was not directly hit by the click point 310, this link will be expanded regardless of whether Always Expand Nearby Elements is on or off, according to the above-described method.

It should be noted that FIGS. 4A-4D are provided merely for the purpose of describing an exemplary embodiment for implementing the principles of the present invention. As such, various modifications may be made, e.g., switching the order of various steps, omitting certain steps, etc., without departing from the spirit or scope of the present invention.

With the exemplary embodiment illustrated in FIGS. 4A-4D having been described, examples will now be provided as to how specific types of interactive elements may be expanded and activated for certain situations. Thereafter, a description will be provided of additional features which may be implemented in combination with the exemplary embodiments of the invention already described.

Layout of Expanded Elements

According to an exemplary embodiment, one or more of the following rules may be applied when positioning the expanded elements 305 on the screen of the display unit 120.

When one or more interactive elements 305 are to be expanded according to the above-described method of FIGS. 4A-4E, the resultant expanded elements 305 are to be positioned as close to their original display position as possible. Multiple expanded elements 305 on the same vertical display line may be moved just enough out from their center points, respectively, so they don't overlap.

The one or more expanded elements 305 on the same display line may then be moved as a single unit with, e.g., edges corresponding to an imaginary rectangle just large enough to contain all the expanded elements. Then, the following rules may be applied to this unit/rectangle:

1) If the one or more expanded elements 305 in the unit are positioned completely within the viewport of the touch-sensitive display screen 120, no further repositioning is necessary;
2) If any part of the unit is positioned outside the viewport, but the unit is small enough for each of the expanded elements to fit inside the viewport, the unit is moved so that each of the expanded elements 305 are positioned inside the viewport; and
3) If the unit is moved, it is moved only as much as possible to make the expanded elements 305 visible, without causing the content of the web page or document move outside the viewport.

However, according to an alternative exemplary embodiment, the unit/rectangle corresponding to the one or more expanded elements may be split into sub-units (or sub-rectangles). For example, according to this alternative embodiment, the following situational rules may then be applied for one or more links which are to be expanded, in an attempt to maintain as much of the initial layout and alignment intact:

1) Situation—One link displayed on one line is to be expanded, and the width of the expanded link would be smaller or equal to the width of the viewport (screen):
   If the link is visible within the viewport before it is expanded, the expanded link may be displayed as close to the pre-expanded link's original position as possible;
   If the link is only partially within the viewport before it is expanded, the entire expanded link may be displayed within the viewport. If the beginning of the pre-expanded link is outside the viewport, the beginning of the expanded link may be positioned at the left edge of the viewport. If the end of the pre-expanded link is outside the viewport, the end of the expanded link may be positioned at the right edge of the viewport.

2) Situation—One link displayed on one line is to be expanded, and the width of the expanded link would be larger than the viewport width: The expanded link may be positioned at the left edge of the viewport.

3) Situation—Multiple links displayed on the same line are to be expanded, and the sum of the widths of the expanded links would be smaller than or equal to the viewport width: All expanded links may be displayed on the same line.

4) Situation—Two links displayed on the same line are to be expanded, and the sum of the widths of the expanded links would be larger than the viewport width: The expanded links may be displayed on two separate lines, which are vertically centered about the original line of the pre-expanded links, and the aforementioned situational rules 1) and 2) may then be applied for displaying each expanded link.

5) Situation—Multiple links displayed on the same line are to be expanded, and the sum of the widths of the expanded would be larger than the viewport width: The rectangle corresponding to the expanded links may be broken into two sub-rectangles, which may be displayed as two stacked rectangles vertically centered about the original rectangle. If a sub-rectangle does not fit within the viewport, it may be broken into two further sub-rectangles, one of which is moved to a new line above or below. This may be repeated until the resultant sub-rectangle fits within the viewport and situational rule 1) may be applied, or until the resultant sub-rectangle comprises only one link, which does not fit the viewport and situational rule 2) may be applied.

6) Situation—One link displayed over two lines is to be expanded, and the rectangle surrounding the link does not overlap any other links: The entire rectangle may be expanded and positioned according to the aforementioned situational rule 1).

7) Situation—One link displayed over two lines (link #1) is to be expanded, and its rectangle overlaps other links (links #2 . . . #n) which are also to be expanded: The rectangle may be split into at least three sub-rectangles, two sub-rectangles for the portions of link #1 on the first and second line, respectively, and at least one sub-rectangle for links #2 . . . #n. The sub-rectangle(s) for expanded links #2 . . . #n may be moved underneath the sub-rectangles for expanded link #1. Further, if the click point 310 is closer to the second line than the first, the sub-rectangles for the expanded links may be shifted so that the sub-rectangle for the first line of expanded link #1 is closer to the click point 310.

Expanding and Activating Specific Types of Interactive Elements

Links:

According to an exemplary embodiment, links may be expanded by enlarging them such that both the width and height of the expanded link is at least a predetermined size, e.g., 7.6 mm. According to this embodiment, the smaller of the height and width is enlarged to the expanded size parameter (e.g., 7.6 mm), while the other of the height and width may be expanded in proportion to keep the same height to width ratio. Of course, the 7.6 mm size parameter is only exemplary, and may be increased or decreased according to the size, type, or quality of the display unit 120, or may be set by the user according to his/her preference.

Further, if both the height and width of the link are larger than the expanded size parameter (e.g., 7.6 mm), the link might not be enlarged further. In this case, the link may be "expanded" simply by applying an animation and/or display effect showing that it has been determined to be a potential target for selection by the user, as will be described in further detail below.

According to an exemplary embodiment, when a link (in either expanded or non-expanded state) is activated, an optional animation may accompany such activation to show the user that the link is being opened, as will be described in more detail below.

In a further exemplary embodiment, when an expanded link is activated, this may result in any other expanded interactive element 305 being set back to its normal display state (i.e., result in the expansion being canceled).

Also, when activating a currently non-expanded link when the Always Expand Nearby Elements setting is off (e.g., according to step S460 in FIG. 4D), the link may first be expanded, and immediately thereafter activated.

Further, it is contemplated that any links to be expanded according to the present invention may retain their original style. I.e., the style of the link defined in the html code or style sheet of the displayed web page or document may be kept intact. However, in a further exemplary embodiment, certain visual modifications may occur to a link when it is expanded. For example, the underlining associated with the link may be removed. Also, the expanded link is given a border which is "skinnable" (i.e., can be given a customized graphical appearance). Furthermore, when a link containing both a text and image(s) is expanded, the image(s) within the link may be expanded together with the text.

Images that are Links:

According to an exemplary embodiment, for an interactive element 305 which functions as both an image and a link (referred to within this specification as an "image that is a link"), such element 305 may generally be expanded and/or activated the same way as a link. For instance, when the size of an image that is a link is in both the height and width dimensions equal to or larger than a predetermined size of expansion, the expanding of such image may be performed by simply displaying the image with an animation and/or other display effects intended to show it is a potential target of selection by the user. On the other hand, if the size of either the height or width of an image that is a link is smaller than the predetermined size, when expanded it may be enlarged so that the smaller of the height and width is the predetermined size, while maintaining the same height/width ratio.

According to an exemplary embodiment, the predetermined size for expansion of an image that is a link may either be the same or different than other types of links.

Figure 5A:
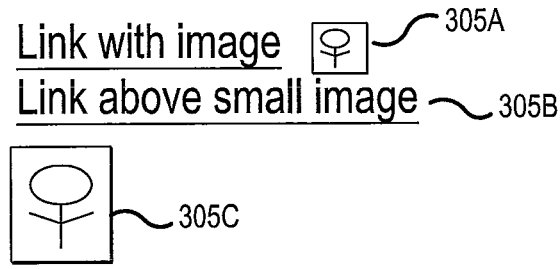
FIGS. 5A-5C illustrate the expansion of a link and an image that that is a link, which are within the touch radius, according to an exemplary embodiment.
Figure 5B:
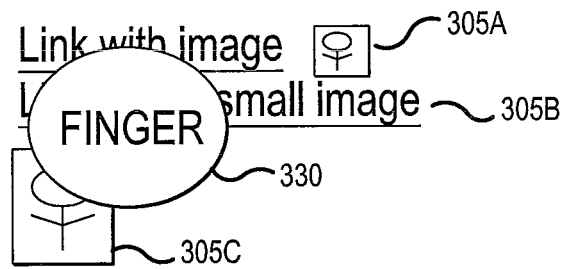
Figure 5C:
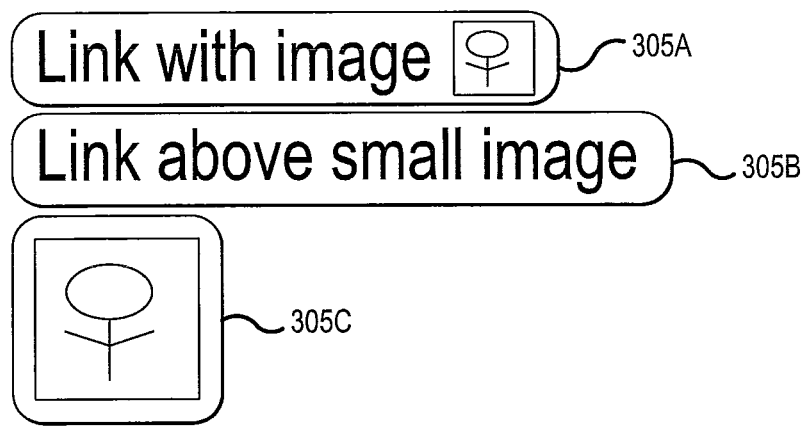

FIGS. 5A-5C illustrate an example of the expansion of interactive elements 305, including links and an image that is a link, which are within the touch radius. FIG. 5A shows three interactive elements 305 being displayed by the user agent 200 before the user touches the display unit 120. These elements 305 in FIG. 5A include a link with an image 305A, a link only with text 305B, and an image that is a link 305C.

According to FIG. 5B, after the user attempts his/her selection by touch, all three elements 305A, 305B, and 305C are at least partially found within the touch radius 330, thus causing all three elements 305A, 305B, and 305C to be expanded according to above-described principles of the invention (regardless of whether Always Expand Nearby Elements is on or off).

FIG. 5C illustrates the results of expanding these three elements 305A, 305B, and 305C. Particularly, FIG. 5C shows that all three are enlarged, and are provided the display effect of skinnable borders. As can be seen from FIG. 5C, this shows a particular embodiment where the image that is a link 305C is given a higher degree or scale of expansion than the other types of links 305A and 305B.

Form Controls:

According to an exemplary embodiment, the expansion of form controls may be performed in substantially the same way as links, although the activation of complex form controls may differ.

As discussed above, the types of interactive elements 305 which may be expanded and/or activated according to the present invention may include form controls, specifically, both simple and complex form controls. The behavior of simple form controls during expansion and activation may differ from that of complex form controls, as will be discussed in more detail below.

Simple Form Controls:

Examples of simple form controls that may be displayed in a web page or document include buttons, check boxes, and radio buttons.

According to an exemplary embodiment, a button generally behaves the same way as described above for links for both expansion and activation. However, there might be some differences between the behavior of buttons and links, e.g., differences in the degrees of expansion, and accompanying animations and/or display effects.

Similarly, checkboxes and radio buttons may exhibit similar behavior as links when they are expanded according to principles of the present invention, with possible differences in the degree of expansion and accompanying animations and/or display effects.

However, FIGS. 6A-6E is provided to illustrate the behavior of a checkbox when it is activated, according to an exemplary embodiment of the invention.

Particularly, FIG. 6A illustrates a link 305D and a checkbox (with text) 305E being displayed by the user agent 200. As shown in FIG. 6B, when both elements 305D and 305E are at least partially within the radius 330, they are both expanded in the same way as shown in FIG. 6C. According to FIG. 6D, the user selects by touch to activate the expanded checkbox 305E, and FIG. 6E illustrates the resultant activation of the checkbox 305E.

As shown in FIG. 6E, the activation of the checkbox 305E results in the checkbox 305E being toggled to a different state, i.e., having a checkmark displayed therein. (Note: since the behavior of the checkbox 305E is to toggle between states upon activation, if the checkbox 305E had originally contained a checkmark in FIG. 6A, it would have been toggled to a state without a checkmark in FIG. 6E). Further, as shown in FIG. 6E, the activation of the checkbox 305E causes it to revert back to its original non-expanded state.

In a further exemplary embodiment, the behavior of radio buttons (not shown) upon activation may be similar to that of checkboxes described above in connection FIGS. 6A-6E.

Complex Form Controls:

Examples of complex form controls include edit fields, listboxes, and drop-down lists. In an exemplary embodiment, complex form controls may have two expanded states: inactivated and activated. In the inactivated state, the user can only select them without editing or interacting with them. Alternatively, the user may edit or further interact with a complex form control in the activated state.

Edit Fields:

An edit field is a complex form control. Edit fields are expanded, making them bigger and easier to interact with (e.g., allowing a user to place a cursor at a specific position in the edit field with a finger or stylus). When an edit field is expanded, the user can cancel the expansion using the same methods as used for canceling expanded links.

FIGS. 7A-7E illustrate the behavior of an edit field when there is an ambiguity as to whether it or another interactive element 305 is being selected by the user's touch.

Specifically, FIG. 7A shows a situation where a web page or document includes two interactive elements 305: an edit field 305F and a link 305G. According to FIG. 7B, after the user first attempts to select one of these elements 305F and 305G by touch, there is ambiguity as to whether the user intended to click the edit field 305F or a link 305G since both are within the touch radius 330. Accordingly, FIG. 7C illustrates both the edit field 305F and link 305G being expanded, the expanded edit field 305F being kept in an inactivated state with no cursor displayed therein (this happens as a result of step S210 of FIG. 4E being performed). However, FIG. 7D shows that the user clicks the edit field 305F while it is in the expanded but inactivated state. According to an exemplary embodiment, and as shown in FIG. 7E, the user's clicking of the expanded but inactivated edit field 305F will cause the expansion of other interactive elements 305 (link 305G in this specific example) to be canceled, and cause the edit field 305F to be brought out of the inactivated state into an activated state in which the cursor is displayed and the edit field 305F can be edited. Also, according to an exemplary embodiment as shown in FIG. 7E, activation of the edit field 305F may further cause it to expand to the full width of the viewport to make it for easier to the user to interact with it.

Drop-Down Lists:

A drop-down list is another type of complex form control. The expansion of drop-down lists in accordance with the principles of the present invention makes them bigger and easier to interact with. When a drop down is expanded the user can cancel the expansion using the same methods as used for canceling expanded links.

According to an exemplary embodiment, if there is an ambiguity whether the user intended to click a drop-down list or another interactive element 305 because both are at least partially within the touch radius 330, both elements are expanded. In this case, the drop-down list is expanded in an inactivated state, i.e., closed. If the drop-down is clicked again in its expanded but inactivated state, it will open or "drop down," and may further be expanded to a size with which the user is more comfortable to interact.

Additional Exemplary Features of Present Invention

Further description will be provided below of additional features which may be implemented in combination with the exemplary embodiments of the invention already described Animations:

According to an exemplary embodiment of the invention, an animation or display effect may optionally accompany each expansion and/or activation of an interactive element 305.

For example, the actual expansion of an interactive element 305 may be animated by gradually increasing the size of the element 305 to its final expanded size, rather than abruptly switching its size from the original non-expanded size to the expanded size. The cancellation of the expanded state of an interactive element 305 may also be animated, i.e., the element 305 may be shown gradually shrinking to its original non-expanded size.

Another example of animation may occur when the expansion of an interactive element 305 necessitates the expanded element 305 being moved to fit within the viewport. For instance, the expanded element 305 may be shown gradually moving to a position that fits within the viewport.

In a further exemplary embodiment, the activation or opening of an expanded link may optionally be accompanied by an animation. The default behavior may be an "explosion,"

where the link is enlarged even further, getting bigger and bigger until it fades out quickly (like it has exploded). However, this default behavior could differ in order to be consistent with a standard behavior on the platform for activating/opening links or other applications.

In yet a further exemplary embodiment, when one or more interactive elements 305 are expanded, a display effect may optionally be provided to gray out or dim out the remainder of the web page or document (including interactive elements not within the touch radius 330, as well as other content). Similarly, when an interactive element 305 is activated, this may further cause other interactive elements 305 in an expanded state to not only revert to their non-expanded state, but also to be grayed out with the rest of the dimmed background (optional).

Scrolling to Cancel Expansion:

As described above in connection with step S60 of FIG. 4A, an exemplary embodiment of the invention only scans the area 320 of touch radius 330 for those interactive elements 305 that are visible to the user, i.e., which are not outside the screen boundaries. Thus, the user interface 201 of the user agent 200 may provide scroll bars and/or a drag-and-scroll feature to allow the user to move interactive element 305 from outside to within the screen's 120 viewing area so that they may be selected.

However, if an interactive element 305 is expanded in the viewing area in accordance with the present invention, the user may be able to cancel its expanded state and reset the element 305 to its original size and/or state through scrolling. Specifically, if the user performs a scrolling operation which causes the expanded element 305 to no longer be within the viewport, this may be sufficient to cancel the expanded state of the interactive element 305.

Other Ways to Cancel Expansion:

According to further exemplary embodiments of the present invention, the expansion of interactive elements 305 may also be cancelled by:

Clicking an expanded link, thereby opening or activating the link;

Clicking a simple form control, which causes the simple form control to activate, i.e., performs the appropriate action;

Clicking any place outside the expanded elements in the grayed out area of the web page or document;

Waiting for a timeout to occur, i.e., a predetermined time period of inactivity, while a link or simple form control is expanded (however, a timeout might not be applicable to complex form controls which are in an expanded and activated state, since they generally require user interaction to confirm completion of task);

Clicking a "Cancel" softkey/button which cancels the expansion (such a "Cancel" softkey/button may be displayed when multiple interactive elements 305 are expanded, or when a single elements 305 is expanded which is not a complex form control; or Clicking a "Done" softkey/button for complex form controls which require user interaction to confirm completion of a task (such a "Done" softkey/button may be displayed when there is a single complex form control in an expanded and activated state).

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

The invention claimed is:

1. A method for selecting an item on a display screen with a touch interface, by touching the touch interface portion of the display screen with a finger or stylus-type device, the method comprising:
   utilizing a processor, which is operably connected to the touch interface of the display screen, to perform the following:
   (a) establish a predetermined touch radius associated with a center of an area of contact detected by the touch interface by interaction with the finger or stylus-type device;
   (b) detect an activated screen area that corresponds to a portion of the screen contained within the touch radius associated with a touch point detected as a result of the finger or stylus-type device activating the touch interface;
   (c) identify selectable items on the display screen which are at least partially contained within the touch radius;
   (d) in response to multiple selectable items being identified in (c) as being at least partially contained within the touch radius of the same detected touch point, partially activate the multiple identified selectable items for confirmation selection by altering the manner in which the multiple identified selectable items are displayed;
   (e) fully activate a partially activated selectable item in response to a detection by the touch interface of another touch point selecting that particular partially activated selectable item; and
   (f) de-activate any partially activated selectable items not selected for full activation.

2. The method of claim 1, wherein
   the processor partially activates an identified selectable item in (d) by enlarging the item's display size.

3. The method of claim 2, wherein the processor partially activates an identified selectable item in (d) by displaying an animation or display effect in connection therewith, in case that the identified selectable item is already displayed at a size greater than or equal to a predetermined size before partial activation.

4. The method of claim 2, further comprising displaying an animation in accompaniment with the enlargement of the display size of the identified selectable item.

5. The method of claim 1, wherein, if only one selectable item is identified in (c) as being at least partially within the touch radius associated with a detected touch point:
   if the identified selectable item is hit by the detected touch point, the identified selectable item is fully activated without requiring confirmation selection, and
   if the identified selectable item is not hit by the detected touch point, the identified selectable item is partially activated such that confirmation selection based on another touch point is necessary to fully activate the identified selectable item.

6. The method of claim 1, wherein the display screen displays a web page, and at least one of the identified selectable items is a hyperlink.

7. An apparatus comprising:
   a display screen having a touch interface configured to detect contact with the display screen by a finger or stylus-type device;
   a processor, which is operably connected to the touch interface, programmed to:
   (a) configure the parameters of the touch interface to set a predetermined touch radius associated with the center of an area of contact detected by the touch interface by interaction with the finger or stylus-type device;

(b) detect an activated screen area that corresponds to a portion of the screen contained within the touch radius associated with a touch point detected as a result of the finger or stylus-type device activating the touch interface;

(c) identify selectable items on the display screen which are at least partially contained within the touch radius;

(d) in response to multiple selectable items being identified in (c) as being at least partially contained within the touch radius of the same detected touch point, partially activate the multiple identified selectable items for confirmation selection by altering the manner in which the multiple identified selectable items are displayed;

(e) fully activate a partially activated selectable item in response to a detection of another touch point selecting that particular partially activated selectable item; and (f) de-activate any partially activated selectable items not selected for full activation.

8. The apparatus of claim 7, wherein the processor partially activates an identified selectable item in (d) by enlarging the item's display size.

9. The apparatus of claim 8, wherein the processor partially activates an identified selectable item in (d) by displaying an animation or display effect in connection therewith, in case that the identified selectable item is already displayed at a size greater than or equal to a predetermined size before partial activation.

10. The apparatus of claim 8, wherein the display screen displays an animation in accompaniment with the enlargement of the display size of the identified selectable item.

11. The apparatus of claim 7, wherein, if only one selectable item is identified in (c) as being at least partially within the touch radius associated with a detected touch point:
  if the identified selectable item is hit by the detected touch point, the processor causes the identified selectable item to be fully activated without requiring confirmation selection, and
  if the identified selectable item is not hit by the detected touch point, the processor causes the identified selectable item to be partially activated such that confirmation selection based on another touch point is necessary to fully activate the identified selectable item.

12. The apparatus of claim 7, wherein the display screen displays a web page, and at least one of the identified selectable items is a hyperlink.

13. The apparatus of claim 7, the apparatus being a mobile telephone or handheld device.

14. A non-transitory computer-readable storage medium having embodied thereon a program that, when executed by a computer, causes it to perform a method for selecting an item on a display screen with a touch interface, by touching the touch interface portion of the display screen with a finger or stylus-type device, the method comprising: (a) configuring parameters of the touch interface to set a predetermined touch radius associated with the center of an area of contact detected by the touch interface by interaction with the finger or stylus-type device; (b) detecting an activated screen area that corresponds to a portion of the screen contained within the touch radius associated with a touch point detected as a result of the finger or stylus-type device activating the touch interface; (c) identifying selectable items on the display screen at least partially contained within the touch radius; (d) in response to multiple selectable items being identified in (c) as being at least partially contained within the touch radius of the same detected touch point, partially activating the multiple identified selectable items for confirmation selection by altering the manner in which the multiple identified selectable items are displayed; (e) fully activating a partially activated selectable item in response to a detection by the touch interface of another touch point selecting that particular partially activated selectable item; and (f) de-activating any partially activated selectable items not selected for full activation.

15. The computer-readable storage medium of claim 14, wherein
  the partially activating step partially activates an identified selectable item by enlarging the item's display size.

16. The computer-readable storage medium of claim 15, wherein the partially activating step partially activates an identified selectable item by displaying an animation or display effect in connection therewith, in case that the identified selectable item is already displayed at a size greater than or equal to a predetermined size before partial activation.

17. The computer-readable storage medium of claim 15, wherein the method further comprises displaying an animation in accompaniment with the enlargement of the display size of the identified selectable item.

18. The computer-readable storage medium of claim 14, wherein, if only one selectable item is identified as being at least partially within the touch radius associated with a detected touch point:
  if the identified selectable item is hit by the detected touch point, the identified selectable item is fully activated without requiring confirmation selection, and
  if the identified selectable item is not hit by the detected touch point, the identified selectable item is partially activated such that confirmation selection based on another touch point is necessary to fully activate the identified selectable item.

19. The computer-readable storage medium of claim 14, wherein a web page is displayed on the display screen, and at least one of the identified selectable items is a hyperlink.

20. The method of claim 1, wherein
  the processor performs (d), (e), and (f) are performed only when multiple selectable items are identified in (c) as being at least partially within the touch radius, and
  when only one selectable item is identified in (c) as being at least partially within the touch radius, and the identified selectable item was hit by the initially-detected touch point, the processor fully activates the identified selectable item without performing (d), (e), and (f).

21. The apparatus of claim 7, wherein
  the processor performs (d), (e), and (f) are performed only when multiple selectable items are identified in (c) as being at least partially within the touch radius, and
  when only one selectable item is identified in (c) as being at least partially within the touch radius, and the identified selectable item was hit by the initially-detected touch point, the processor fully activates the identified selectable item without performing (d), (e), and (f).

22. The computer-readable medium of claim 14, wherein (d), (e), and (f) are performed only when multiple selectable items are identified in (c) as being at least partially within the touch radius, and
  when only one selectable item is identified in (c) as being at least partially within the touch radius, and the identified selectable item was hit by the initially-detected touch point, the identified selectable item is fully activated without (d), (e), and (f) having been performed.

* * * * *